(12) United States Patent
Shi et al.

(10) Patent No.: US 8,369,315 B2
(45) Date of Patent: Feb. 5, 2013

(54) CALL CONNECTION METHOD, EQUIPMENT, AND SYSTEM IN IP MULTIMEDIA SUBSYSTEM

(75) Inventors: Youzhu Shi, Shenzhen (CN); Qing Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 478 days.

(21) Appl. No.: 12/611,654

(22) Filed: Nov. 3, 2009

(65) Prior Publication Data

US 2010/0046509 A1   Feb. 25, 2010

Related U.S. Application Data

(63) Continuation of application No. PCT/CN2008/071818, filed on Jul. 30, 2008.

(30) Foreign Application Priority Data

Aug. 10, 2007  (CN) .......................... 2007 1 0135725
Aug. 31, 2007  (CN) .......................... 2007 1 0145704

(51) Int. Cl.
*H04L 12/66* (2006.01)
(52) U.S. Cl. ............................................. 370/352
(58) Field of Classification Search ........................ None
See application file for complete search history.

(56) References Cited

U.S. PATENT DOCUMENTS

| 8,102,989 B1 * | 1/2012 | Findlay .......................... 379/229 |
| 2004/0249951 A1 * | 12/2004 | Grabelsky et al. ............. 709/227 |
| 2007/0113086 A1 | 5/2007 | Huang et al. |
| 2007/0133574 A1 * | 6/2007 | Tejani et al. .................. 370/401 |
| 2008/0254816 A1 | 10/2008 | Sun et al. |

FOREIGN PATENT DOCUMENTS

| CN | 1404261 A | 3/2003 |
| CN | 1642083 A | 7/2005 |
| CN | 1859723 A | 11/2006 |
| CN | 1984199 A | 6/2007 |
| CN | 101365240 B | 11/2011 |
| EP | 1775902 A1 | 4/2007 |
| EP | 1 962 464 A1 | 8/2008 |
| WO | WO 0178347 A2 | 10/2001 |
| WO | WO 2006038099 A2 | 4/2006 |
| WO | 2007045991 A1 | 4/2007 |

OTHER PUBLICATIONS

Written Opinion of the International Searching Authority issued in corresponding International Patent Application No. PCT/CN2008/071818, mailed Nov. 13, 2008.
Office Action issued in corresponding Chinese Patent Application No. 200710145704.8, mailed Nov. 16, 2010.

* cited by examiner

*Primary Examiner* — Yong Zhou
(74) *Attorney, Agent, or Firm* — Brinks Hofer Gilson & Lione

(57) ABSTRACT

A call connection method in an IP multimedia subsystem (IMS) is provided. The method includes the following steps. An entrance network element (NE) of a called network receives a session request carrying called user identification (ID) information from a calling network. When determining that the called user ID information is incomplete, the entrance NE of the called network sends a response message indicating that the called user ID information is incomplete to the calling network. The calling network updates the called user ID information according to the response message, and sends the updated called user ID information to the entrance NE of the called network. An interface NE, a called network system, a call connection system, and a method of informing a call connection failure are also provided.

12 Claims, 4 Drawing Sheets

CALL CONNECTION METHOD, EQUIPMENT, AND SYSTEM IN IP MULTIMEDIA SUBSYSTEM

CROSS-REFERENCE TO RELATED APPLICATIONS

This application is a continuation of International Patent Application No. PCT/CN2008/071818, filed on Jul. 30, 2008, which claims priority to Chinese Patent Application Nos. 200710135725.1 and 200710145704.8, respectively filed on Aug. 10, 2007 and Aug. 31, 2007, all of which are hereby incorporated by reference in their entireties.

FIELD OF THE INVENTION

The present invention relates to the field of an IP multimedia subsystem (IMS), and more particularly to a call connection method, equipment, and system in an IMS.

BACKGROUND OF THE INVENTION

With the progress of grouping technology, a conventional circuit-switched telecommunication network is developing towards a packet-switched broadband telecommunication network, and a Session Initiation Protocol (SIP) serving as call control signaling of a packet telecommunication core network is among current developing trends of the technology. For example, in the research of a Next Generation Network (NGN), standard organizations, for example, the International Telecommunication Union-Telecommunication Standardization Sector (ITU-T) and the European Telecommunications Standards Institute (ETSI), all adopt an IP multimedia subsystem (IMS) network architecture defined by the Third Generation Partnership Project (3GPP) as a core network of the NGN.

The IMS defined by the 3GPP is a target network in the Third Generation (3G) mobile communication network for implementing packet voice and packet data and providing unified multimedia services and applications. The IMS adopts an IP packet domain as a bearer channel for signaling control and media transmission, and adopts the SIP as call control signaling to realize the separation of service management, session control, and bearer accessing. The SIP with its core component defined by the Internet Engineering Task Force (IETF) is an application-layer control protocol for establishing, modifying, and terminating a multimedia session or call. The multimedia session includes a multimedia conference, tele-education, an IP phone call, and the like.

With the increasing progress and commercial applications of the IMS technology, operators have considered the evolution of a conventional public switched telephone network (PSTN) to an IMS network, and a conventional plain old telephone service (POTS) end user is enabled to get access to the IMS network.

However, the POTS terminal adopts a dialing mode of overlap sending, that is, once a user dials digits, the POTS terminal transfers the digits to the network. While the SIP over the IMS network supports enblock sending, that is, after the user dials all the digits, the SIP transfers the called digits to the network at a time. Therefore, when the POTS terminal accesses the IMS network, the IMS network needs to support the overlap sending.

Currently, no appropriate technical solution is provided in the prior art to enable the IMS network to support the overlap sending. Further, in the IMS network in the prior art, when a call connection fails due to an incomplete address of called user identification (ID) information resulting from the overlap sending, the calling network may not be informed about the reason of the call connection failure, thus leading to the call connection failure.

SUMMARY OF THE INVENTION

One of various embodiments of the present invention provides a method of informing a call connection failure in an IMS, so as to inform a calling network about a reason of a call connection failure.

One of various embodiments of the present invention provides a call connection method in an IMS, so as to support overlap sending in an IMS network.

One of various embodiments of the present invention provides an entrance NE in an IMS, which can be configured to support overlap sending in an IMS network.

One of various embodiments of the present invention provides a called network system in an IMS, which may be configured to support overlap sending in an IMS network.

One of various embodiments of the present invention provides a call connection system in an IMS, which can be configured to support overlap sending in an IMS network.

The following technical solutions are provided in embodiments of the present invention.

A method of informing a call connection failure in an IMS includes the following steps.

An entrance NE of a called network receives a session request carrying called user ID information from a calling network.

When determining that the called user ID information is incomplete, the entrance NE of the called network sends a response message indicating that the called user ID information is incomplete to the calling network, so as to inform the calling network about a call connection failure.

A call connection method in an IMS includes the following steps.

An entrance NE of a called network receives a session request carrying called user ID information from a calling network.

When determining that the called user ID information is incomplete, the entrance NE of the called network sends a response message indicating that the called user ID information is incomplete to the calling network.

The calling network updates the called user ID information according to the response message, and sends the updated called user ID information to the entrance NE of the called network.

An entrance NE in an IMS includes a session request receiving unit and a called user ID information determining unit. The session request receiving unit is configured to receive a session request carrying called user ID information from a calling network. The called user ID information determining unit is configured to send a response message indicating that the called user ID information is incomplete to the calling network, when determining that the called user ID information is incomplete.

A called network system in an IMS includes an entrance NE and a routing information database. The entrance NE is configured to receive a session request carrying called user ID information from a calling network, query called user address information in a routing information database according to the called user ID information, and send a response message indicating that the called user ID information is incomplete to the calling network when the query fails. The routing information database is configured to save the called user address information.

A call connection system in an IMS includes a calling network and an entrance NE of a called network. The calling network is configured to send a session request carrying called user ID information to the entrance NE of the called network. The entrance NE of the called network is configured to send a response message indicating that the called user ID information is incomplete to the calling network, when determining that the called user ID information is incomplete.

A call connection system in an IMS includes a calling network and a called network. The calling network includes an overlap sending terminal, an access NE of the calling network, and a service-call session control function (S-CSCF) of the calling network. The called network includes an access NE of the called network. The S-CSCF of the calling network is connected to the access NE of the called network.

The overlap sending terminal is configured to send called user ID information to the access NE of the calling network.

The access NE of the calling network is configured to enable the overlap sending terminal to access an IMS network, carry the called user ID information in a session request, and send the session request to the S-CSCF of the calling network.

The S-CSCF of the calling network is configured to route the session request to the access NE of the called network.

The access NE of the called network is configured to send a response message indicating that the called user ID information is incomplete to the S-CSCF of the calling network, when determining that the called user ID information is incomplete.

From the above technical solutions, the entrance NE of the called network receives the session request carrying the called user ID information from the calling network, and sends the response message indicating that the called user ID information is incomplete to the calling network, when determining that the called user ID information is incomplete. Therefore, in the implementation of the embodiments of the present invention, the calling network is informed about the reason of the call connection failure, and the overlap sending in the IMS network is realized by subsequent processing of the calling network.

DETAILED DESCRIPTION OF THE EMBODIMENTS

Figure 1:
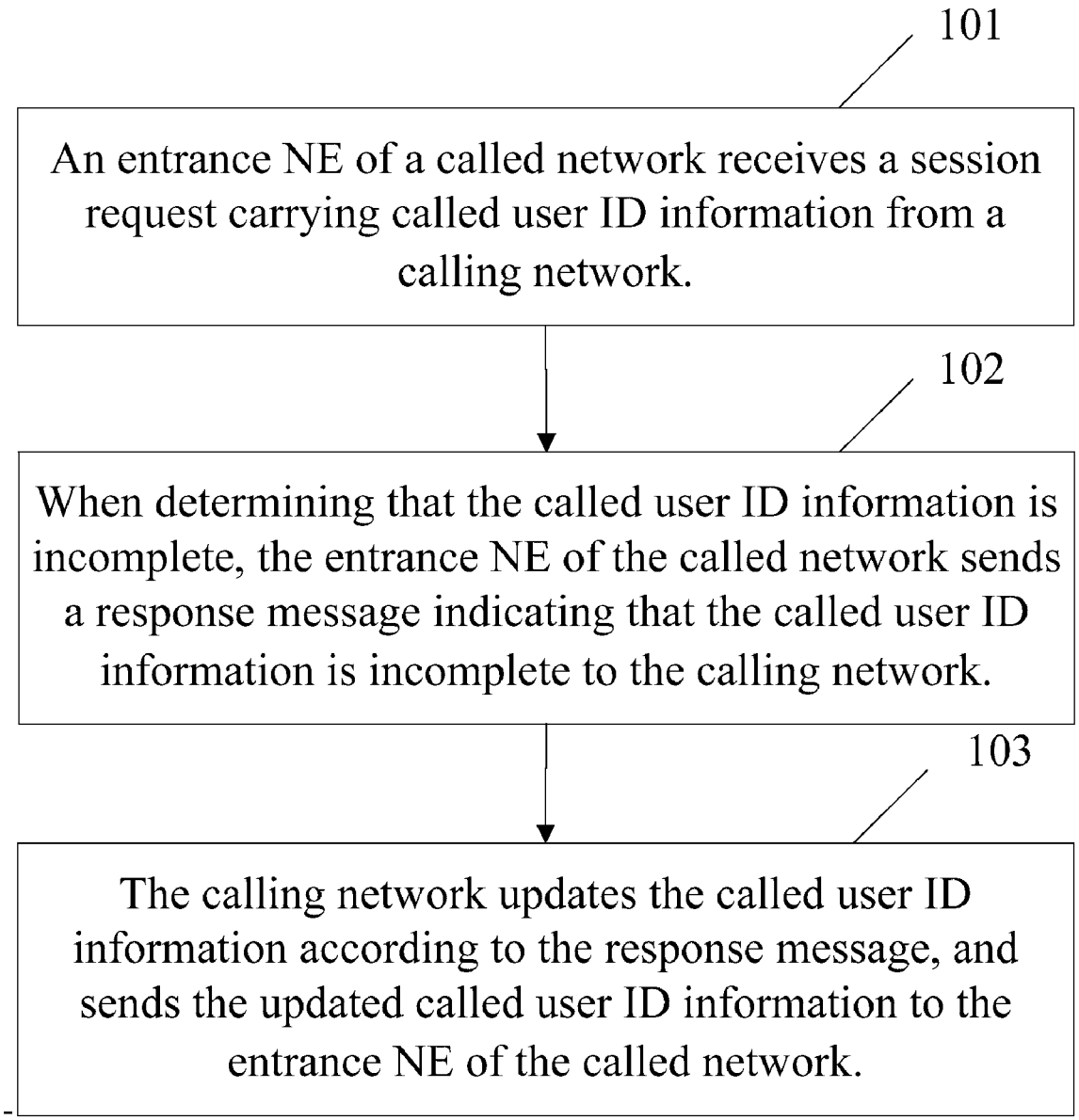
FIG. 1 is a flow chart of a call connection method in an IMS according to an embodiment of the present invention.

FIG. 1 is a flow chart of a call connection method in an IMS according to an embodiment of the present invention.

Referring to FIG. 1, the method includes the following steps.

In Step 101, an entrance NE of a called network receives a session request carrying called user ID information from a calling network.

Here, the entrance NE of the called network may be an interrogating call session control function (I-CSCF), an interconnection border control function (IBCF), or a media gateway control function (MGCF).

The session request sent by the calling network may be selected from the following SIP messages, including an initial session request INVITE, a subsequent request of the initial session request re-INVITE, a reference request REFER, a message request MESSAGE, a subscription request SUBSCRIBE, and an information request INFO. The called user ID information may be in a format of a TEL universal resource identifier (URI) or a SIP URI.

The called user ID information may be carried in the following parts of the session request:
1) A Request URI; or
2) A header field (for example, a To header field or Refer-To header field); or
3) A message body, for example, a message body of a specific multipurpose internet mail extensions (MIME) type.

Moreover, the session request may also include a called user ID requirement request. The called user ID requirement request indicates whether to request required information from the called network for the called user ID information to be returned when the called user ID information is incomplete. The required information includes, for example, a required minimum digit length, a required maximum digit length, a required address type (at home or abroad), and a required address format (SIP URI or TEL URI).

The called user ID requirement request may be a direct indication or an indirect indication, for example, carrying capability information about a terminal and supporting overlap sending for indirectly indicating a request of the required information from the called network for the called user ID information to be returned.

The called user ID requirement request may be carried in the following parts of the session request:
1) A Request URI (for example, indicated by a specific prefix of the URI); or
2) A header field (for example, a Contact, Supported, or Required header field); or
3) A message body, for example, a message body of a specific MIME type.

In Step 102, when determining that the called user ID information is incomplete, the entrance NE of the called network sends a response message indicating that the called user ID information is incomplete to the calling network, so as to inform the calling network about a call connection failure.

Here, the incompleteness of an address of the called user ID information means that the called network is unable to obtain called user address information according to the called user ID information, and thus cannot realize the routing of the session request.

In order to determine whether the called user ID information is complete, the entrance NE of the called network queries a user subscription database, and determines whether the called user ID information is a valid called user ID.

Further, when the called user ID information is incomplete, the user subscription database returns to the entrance NE the required information for the called user ID information, including, for example, the required minimum digit length, the required maximum digit length, the required address type (at home or abroad), and/or the required address format (SIP URI or TEL URI), and the entrance NE sends the required information from the called network for the called user ID information to the calling network.

Further, in order to require the user subscription database to return the required information for the called user ID information, the entrance NE of the called network carries a called ID information requirement indication in a query message.

In addition, the entrance NE of the called network determines whether to require the user subscription database to return the required information for the called user ID information according to the session request from the calling network or configuration information thereof.

When determining whether to require the user subscription database to return the required information for the called user ID information according to the session request from the calling network, the entrance NE of the called network actually performs the determination according to the called user ID requirement request in the calling network session request.

When determining that the called user ID information is incomplete, the entrance NE of the called network sends a response message indicating that the called user ID information is incomplete to the calling network. The response message sent by the entrance NE of the called network to the calling network may be a response message to the session request message in Step 101 or a new request message, for example, an INFO message.

The entrance NE of the called network may also indicate that the address of the called user ID information is incomplete through a specific response message (for example, a 484 (address incomplete) response message). The entrance NE of the called network may also carry corresponding indication information in a header field or message body of a corresponding response message or request message, for example, indicating that the called user ID information is incomplete in a Reason header field of any failure response message or INFO request message.

Further, the response message sent by the entrance NE of the called network may also carry required information from the called network for the called user ID information, including, for example, a required minimum digit length, a required maximum digit length, a required address type (at home or abroad), and/or a required address format (SIP URI or TEL URI).

In view of the above, the implementation of Steps 101 and 102 realizes the informing of a call connection failure in the IMS, so that the calling network is informed about the reason of a call connection failure through the response message.

Preferably, the calling network performs subsequent processing according to the received response message, and the above process further includes the following steps.

In Step 103, the calling network updates the called user ID information according to the response message, and sends the updated called user ID information to the entrance NE of the called network.

After receiving the response message, the calling network waits for a user to dial digits and then collects the digits or converts the called user ID information to obtain the updated called user ID information.

If the response message carries the required information from the called network for the called user ID information, the calling network converts the called user ID information according to the required information or continues waiting for the user to dial digits and then collects the digits.

Afterwards, the calling network sends a session request carrying the updated called user ID information to the called network.

The calling network may send the session request to the called network in the following manners:

1) The calling network initiates a new request, for example, a re-INVITE request or an INFO request, in a current session, and carries the updated called user ID information in the new request; or 2) The calling network releases a current session, then sends a new session request, for example, an INVITE request, a REFER request, a MESSAGE request, or a SUBSCRIBE request, and carries the updated called user ID information in the new session request.

The updated called user ID information carried in the session request may be complete information or newly added information of the updated called user ID information. The entrance NE of the called network obtains the complete called user ID information according to the newly added information.

Based on the above analysis, in an embodiment, the present invention further provides an entrance NE in an IMS.

Figure 2:
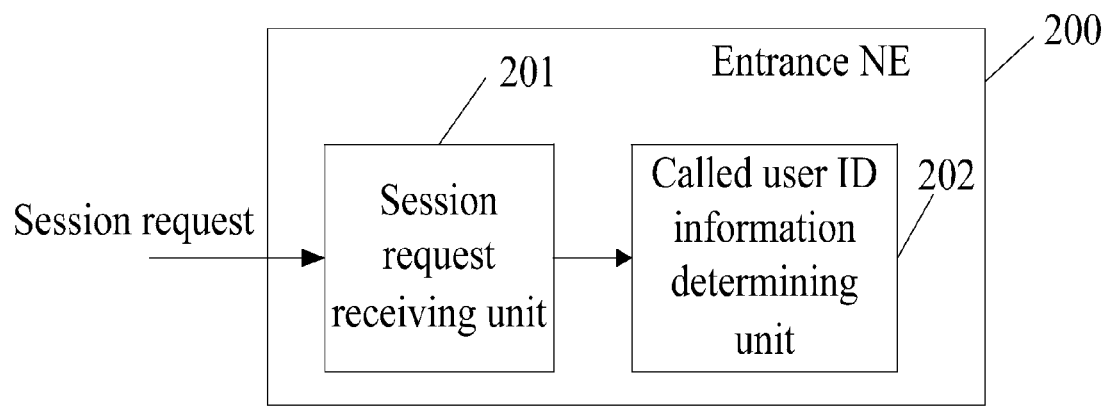
FIG. 2 is a schematic structural view of an entrance NE in an IMS according to an embodiment of the present invention.

FIG. 2 is a schematic structural view of an entrance NE 200 in an IMS according to an embodiment of the present invention.

Referring to FIG. 2, the entrance NE 200 includes a session request receiving unit 201 and a called user ID information determining unit 202.

The session request receiving unit 201 is configured to receive a session request carrying called user ID information from a calling network.

The called user ID information determining unit 202 is configured to send a response message indicating that the called user ID information is incomplete to the calling network, when determining that the called user ID information is incomplete.

The called user ID information determining unit 202 queries a user subscription database to determine whether an address of the called user ID information is complete.

The called user ID information determining unit 202 is further configured to carry required information for the called user ID information in the response message.

In addition, the session request also includes a called user ID requirement request. At this point, the entrance NE 200 further includes a called user ID information processing unit. The called user ID information processing unit is configured to initiate a query request carrying the called user ID requirement indication to a routing information database, and carry the required information for the called user ID information returned by the user subscription database according to the called user ID requirement indication in the response message.

In an embodiment, the present invention further provides a called network system in an IMS.

Figure 3:
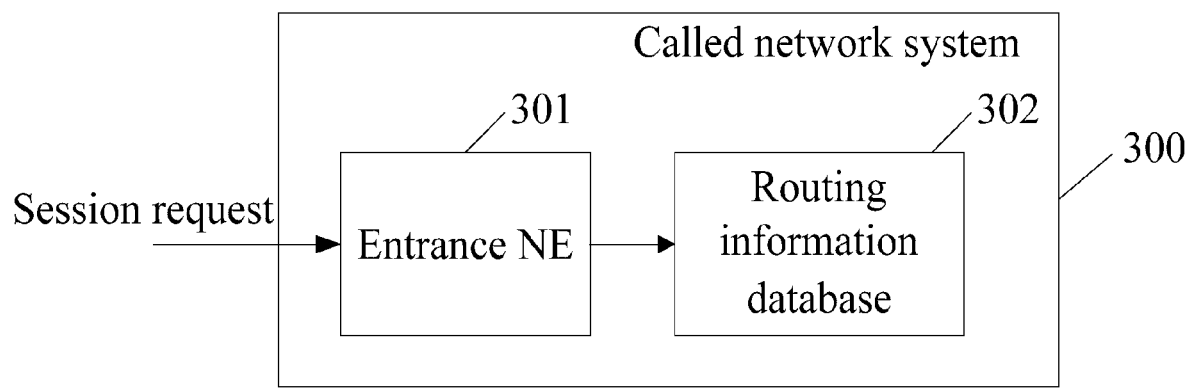
FIG. 3 is a schematic structural view of a called network system in an IMS according to an embodiment of the present invention.

FIG. 3 is a schematic structural view of a called network system in an IMS according to an embodiment of the present invention.

Referring to FIG. 3, the called network system 300 includes an entrance NE 301 and a routing information database 302.

The entrance NE 301 is configured to receive a session request carrying called user ID information from a calling network, query called user address information in the routing information database 302 according to the called user ID information, and send a response message indicating that the called user ID information is incomplete to the calling network when the query fails.

The routing information database 302 is configured to save the called user address information. Preferably, the routing information database 302 is a user subscription database. The routing information database 302 is further configured to carry required information for the called user ID information in the response message.

Moreover, the entrance NE 301 is configured to send a query message carrying a called ID information requirement indication to the routing information database 302. The routing information database 302 is configured to receive the query message, query called user address information according to the called user ID information, and return required information for the called user ID information to the entrance NE 301 according to the called ID information requirement indication.

An embodiment of the present invention further provides a call connection system in an IMS.

Figure 4:
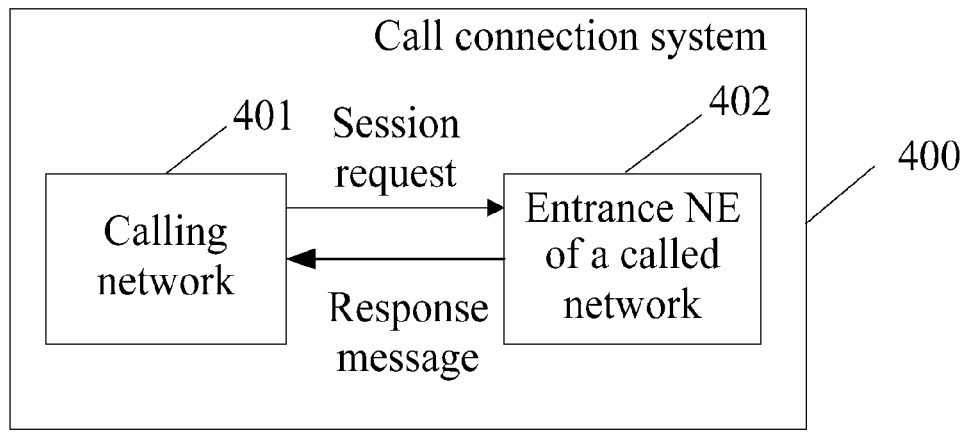
FIG. 4 is a schematic structural view of a call connection system in an IMS according to an embodiment of the present invention.

FIG. 4 is a schematic structural view of a call connection system in an IMS according to an embodiment of the present invention.

Referring to FIG. 4, the call connection system 400 includes a calling network 401 and an entrance NE of a called network 402.

The calling network 401 is configured to send a session request carrying called user ID information to the entrance NE of the called network 402.

The entrance NE of the called network 402 is configured to send a response message indicating that the called user ID information is incomplete to the calling network 401, when determining that the called user ID information is incomplete.

The calling network 401 is further configured to update the called user ID information according to the response message, and send the updated called user ID information to the entrance NE of the called network 402.

The calling network 401 may initiate a new request in a current session, and carry the updated called user ID information in the new request.

Alternatively, the calling network 401 may release a current session, initiate a new session request to the entrance NE of the called network 402, and carry the updated called user ID information in the new session request.

The updated called user ID information sent by the calling network 401 to the entrance NE of the called network 402 includes complete information of the updated called user ID information sent to the entrance NE of the called network 402 or newly added information of the updated called user ID information sent to the entrance NE of the called network 402.

Figure 5:
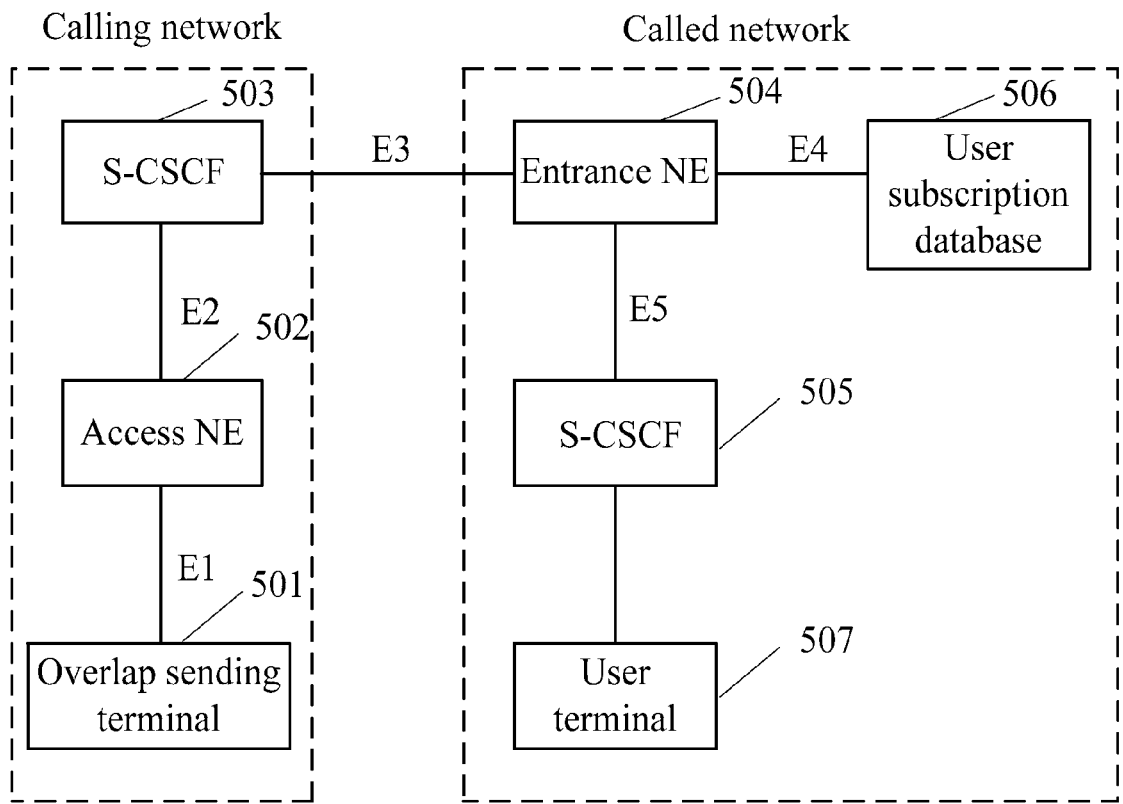
FIG. 5 is a schematic structural view exemplifying a call connection system in an IMS according to an embodiment of the present invention.

FIG. 5 is a schematic structural view exemplifying a call connection system in an IMS according to an embodiment of the present invention.

Referring to FIG. 5, the system includes a calling network and a called network. The calling network includes an overlap sending terminal 501, an access NE of the calling network 502, and an S-CSCF of the calling network 503. The called network includes an access NE of the called network 504. The S-CSCF of the calling network 503 is connected to the access NE of the called network 504.

The overlap sending terminal 501 is configured to send called user ID information to the access NE of the calling network 502. The overlap sending terminal 501 is a terminal that supports overlap sending, for example, a POTS terminal.

The access NE 502 is configured to enable the overlap sending terminal 501 to access an IMS network, carry the called user ID information in a session request, and send the session request to the S-CSCF of the calling network 503. The access NE 502 is an NE that enables the overlap sending terminal 501 to access the IMS network, for example, an integrated access device (IAD), an access gateway (AG), or an access gateway control function (AGCF). An interface E1 is provided between the access NE 502 and the downward overlap sending terminal 501. The interface E1 is based on, but not limited to, Protocol H.248 or SIP, and may be a direct interface or an indirect interface. If the interface E1 is an indirect interface, other NEs exist between the access NE 502 and the overlap sending terminal 501.

The S-CSCF 503 is configured to route the session request to the access NE of the called network 504. The S-CSCF 503 is an IMS NE in the calling network, and provides session control and routing functions. An interface E2 is provided between the S-CSCF 503 and the downward access NE 502. The interface E2 is based on a protocol, for example, SIP, and may be a direct interface or an indirect interface. If the interface E2 is an indirect interface, other NEs exist between the S-CSCF 503 and the access NE 502.

The entrance NE of the called network 504 is configured to send a response message indicating that the called user ID information is incomplete to the S-CSCF of the calling network 503, when determining that the called user ID information is incomplete. The entrance NE of the called network 504 is a first NE through which a call enters the called network, for example, an I-CSCF. An interface E3 is provided between the entrance NE of the called network 504 and the leftward S-CSCF 503. The interface E3 is based on a SIP protocol, and may be a direct interface or an indirect interface. If the interface E3 is an indirect interface, other NEs exist between the entrance NE of the called network 504 and the S-CSCF 503.

Moreover, the called network further includes a user subscription database 506 configured to store and manage user subscription data, for example, a home subscriber server (HSS). An interface E4 is provided between the user subscription database 506 and the leftward entrance NE 504. The interface E4 is based on a Diameter protocol, and may be a direct interface or an indirect interface. If the interface E4 is an indirect interface, other NEs exist between the user subscription database 506 and the entrance NE 504.

The called network further includes an S-CSCF of the called network 505.

The S-CSCF of the called network 505 is an IMS NE in the called network, and provides session control and routing functions. An interface E5 is provided between the S-CSCF 505 and the upward entrance NE 504. The interface E5 is based on a SIP protocol, and may be a direct interface or an indirect interface. If the interface E5 is an indirect interface, other NEs exist between the S-CSCF 505 and the entrance NE 504.

The access NE of the calling network 502 is further configured to receive and collect digits dialed by the overlap sending terminal 501, and send a session request through the S-CSCF 503 to the access NE of the called network 504 again after determining that the called user ID information is satisfactory according to the required information from the called network for the called user ID information.

The access NE of the called network 504 is configured to route the session request to the S-CSCF of the called network 505, when determining that the called user ID information is complete.

The S-CSCF of the called network 505 is configured to route the session request to a user terminal 507, so as to realize the connection of the session request.

Figure 6:
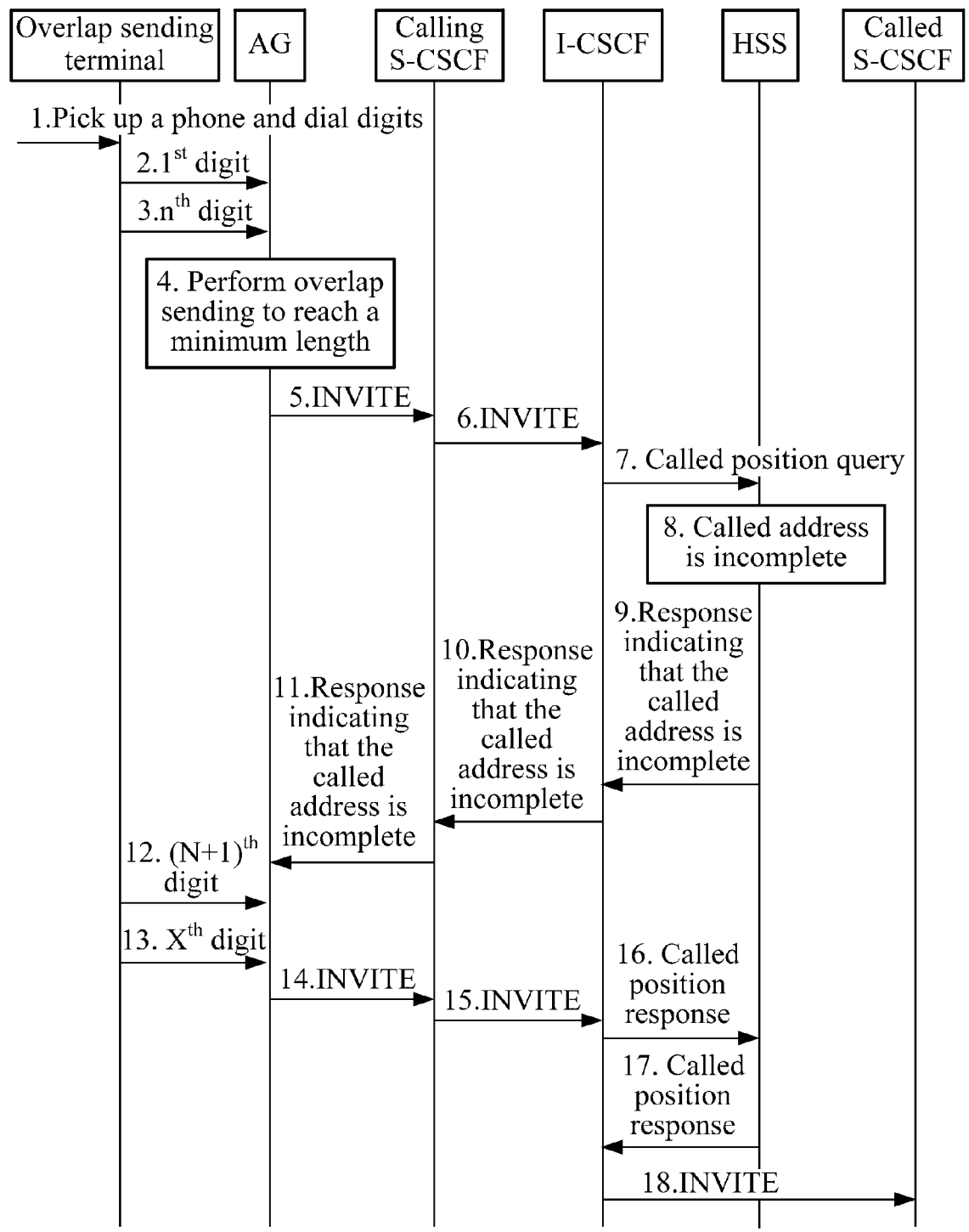
FIG. 6 is a schematic flow chart exemplifying a call connection method in an IMS according to an embodiment of the present invention.

Based on the above structural diagram, FIG. 6 is a schematic flow chart exemplifying a call connection method in an IMS according to an embodiment of the present invention.

Referring to FIG. 6, the method includes the following steps.

In Step 1, an overlap sending terminal user (referred to as user in short hereinafter) picks up a phone and dials digits, for example, 28423279 of a desired called user.

In Step 2, the user dials the first digit "2", and the AG collects the digit.

In Step 3, the user continues dialing the remaining digits.

In Step 4, when the digits dialed by the user reach a minimum digit length configured on the AG, the AG initiates a session request. For example, the minimum digit length configured on the AG is 4, and the AG initiates the session request after the user dials "2842".

In Step 5, the AG initiates the session request to the S-CSCF of the calling network, and sends an INVITE request message to the S-CSCF of the calling network. A Request URI of the INVITE request carries the called user ID information, which is expressed in a format of TEL URI: 2842.

In addition, the AG may also transmit the above information in a format of SIP URI, for example, SIP URI: 2842@telechina.com.

Here, a circumstance that the AG initiates an initial session request through an INVITE message is described. In practice, the AG may also initiate a message request through MESSAGE, or initiate a subscription request through SUBSCRIBE, or initiate a reference request through REFER. The Request URI carries the called user ID information. The processing of the called network is similar to that of the INVITE request.

Further, as the AG supports overlap sending, the AG may carry a called user ID requirement request in the INVITE message, which is expressed in a format of Supported: overlap.

The AG may also carry the called user ID requirement request in other header fields, or Request URI, or message bodies.

In Step 6, the S-CSCF of the calling network forwards the INVITE request to the entrance NE of the called network I-CSCF.

The S-CSCF of the calling network may also forward the INVITE request to the entrance NE of the called network IBCF. The processing of the IBCF is similar to that of the I-CSCF, and the details may not be described herein again.

In Step 7, the entrance NE of the called network I-CSCF sends a called position query request to the user subscription database (for example, an HSS). That is, the entrance NE of the called network I-CSCF sends a called position query request to the HSS through a user authorization request (UAR) message based on the Diameter protocol. The UAR message carries the called user ID information, so as to query position information about the called user.

Further, as the received INVITE request carries the called user ID requirement request, the I-CSCF carries a called ID information requirement indication in a query message when sending the called position query request to the user subscription database.

The I-CSCF may also determine whether to carry the called ID information requirement indication in the query message through local configuration (for example, from a calling network or in a default manner).

The entrance NE of the called network may also determine whether to require the user subscription database to return the required information for the called user ID information according to the session request from the calling network or configuration information thereof.

The called ID information requirement indication is carried in the UAR message in the following manner.

A new attribute-value pair (AVP) is extended. For example, an AVP of Require-Valid-Called-Address-Indication is extended, which indicates whether to require the user subscription database to return the required information for the called user ID information. If an enumerated value is 0, the user subscription database does not need to return the required information, and if the enumerated value is 1, the user subscription database needs to return the required information.

Here, the I-CSCF accesses the user subscription database to query called position information. In practice, the I-CSCF may also access a local database or other network entities to query the called position information.

In Step 8, the HSS accesses a local database (or other databases) to query position information about the called user according to the called user ID information. In this embodiment, the called user ID information in the calling network carries the digits of 2842 which are incomplete digits of the called user, so that the HSS is unable to obtain called user address information according to the called number.

In Step 9, the HSS returns a query result indicating that the called address is incomplete to the I-CSCF. For example, the HSS returns a query result to the I-CSCF through a user authentication answer (UAA) message based on the Diameter protocol, and the UAA message carries an indication about the incompleteness of the called address.

The indication about the incompleteness of the called address is carried in the UAA message in the following manners.

A. Use an existing parameter: for example, adopt a Result-Code AVP value of the UAA message, and if the value is DIAMETER_UNREGISTERED_SERVICE, the address is incomplete.

B. Use an existing AVP, and extend its value: for example, extend an enumerated value of a Result-Code AVP, and if the value is DIAMETER_UNCOMPLETE_ADDRESS, the address is incomplete.

Moreover, the UAA message may also carry required information for the called user ID information, including, for example, a required minimum digit length, a required maximum digit length, a required address type (at home or abroad), and/or a required address format (SIP URI or TEL URI).

In order to carry the required information for the called user ID information in the UAA message, a new AVP is extended. For example, the following AVPs may be extended:

Called-Address-Min-Length: representing a required minimum digit length;

Called-Address-Max-Length: representing a required maximum digit length;

Called-Address-Type-Required: representing a required called address type, for example, an enumerated value of INTERNATIONAL requires an international number, an enumerated value of NATIONAL requires a national number, and an enumerated value of LOCAL requires a local number; and Called-Address-Format-Required: representing a required called address format, for example, an enumerated value of FORMAT_TEL_URI requires a TEL URI format and an enumerated value of FORMAT_SIP_URI requires a SIP URI format.

In Step 10, the I-CSCF of the called network sends a response message indicating that the address of the called user ID information is incomplete to the calling network.

The I-CSCF of the called network may also indicate that the address of the called user ID information is incomplete through a specific response message (for example, a 484

(address incomplete) response message). The I-CSCF of the called network may also carry indication information in a header field or message body of a corresponding response message or request message, for example, indicating that the address is incomplete in a Reason header field of an INFO request message.

Further, the response message may also carry the required information from the called network for the called user ID information through a MIME message body for transmission. For example, an application/called-address-required type is extended as follows:

SIP/2.0 484 Address Incomplete
. . .
Content: application/called-address-required
Content-Length: . . .
[Body]
Min-length: 8
Max-length: 8
Type-Required: LOCAL
Format-Required: TEL_URI The minimum digit length is 8, the maximum digit length is 8, the required ID type of the called user is a local address, and the required ID format of the called user is TEL URI.

In Step 11, the S-CSCF of the calling network forwards the 484 response message to the AG of the calling network.

In Step 12, the AG of the calling network waits for a user to dial digits and collects the digits.

In Step 13, the user finishes dialing a number of eight digits "28423279".

In Step 14, the AG of the calling network determines that the digits dialed by the user satisfy the requirement of the called network according to the required information for the called user ID information (with a minimum digit length of 8 and a maximum digit length of 8) carried in the called network response message, and sends a session request to the called network.

In order to send a session request to the called network, the AG may firstly release a current session and then initiate a new session request, or initiate a new request in a current session. The initiating a new session request by the AG is similar to Step 505. Here, the initiating a new request by the AG in a current session is illustrated as an example. The AG initiates a re-INVITE request or an INFO request in the current session. The updated user ID information may be transmitted in a Request URI, a SIP header field, or a message body.

In order to carry the updated called user ID information in the session request, complete information of the updated called user ID information may be carried in the session request, for example, TEL URI: 28783279 is carried in a Request URI through a re-INVITE request; or newly added information of the updated called user ID information may be carried in the session request, for example, digits dialed lately by the user: TEL URI: 3279 are carried in a To header field through an INFO message.

In this embodiment, the AG sends a re-INVITE request (an INVITE message is shown in the figure, and is different from the INVITE message, the re-INVITE request is within the same session). The Request URI carries the TEL URI: 28783279.

In Step 15, the S-CSCF of the calling network forwards the INVITE request to the entrance NE of the called network I-CSCF.

In Step 16, the entrance NE of the called network I-CSCF sends a called position query request to the user subscription database (HSS) (similar to Step 7). If the calling network carries the newly added information in the called user ID of the INVITE request, for example, the called user ID carried by the re-INVITE request is TEL URI: 3279, the I-CSCF needs to integrate the called user ID information with the initially received ID TEL URI: 2842 into TEL URI: 28423279, and send a called position query request to the user subscription database (HSS) according to the integrated called user ID information.

In Step 17, the HSS accesses a local database or other databases to query position information about the called user, which is similar to Step 8.

In Step 18, the HSS returns a query result to the I-CSCF. If the query result indicates that the address is still incomplete, similar to Step 9, the HSS indicates that the called address is incomplete, and subsequent Steps 9 to 17 are repeated, which may not be described herein again.

In this embodiment, as the calling network inputs complete called address information, after the called user finishes registration, the HSS returns an address of the S-CSCF of the called network registered by the called user, and the I-CSCF of the called network forwards the session request to the S-CSCF of the called network. Thereby, the S-CSCF of the called network is enabled to implement the routing of the session, so as to realize the connection of the session.

In view of the above, in the implementation of the embodiments of the present invention, the entrance NE of the called network receives the session request carrying called user ID information from the calling network, and then sends the response message indicating that the called user ID information is incomplete to the calling network, when determining that the called user ID information is incomplete. Therefore, the calling network is informed about the reason of the call connection failure, and overlap sending in the IMS network is realized by subsequent processing of the calling network. In this manner, the IMS network may interwork with different calling networks.

Through the above description of the embodiments, it is apparent to persons skilled in the art that the present invention may be accomplished by software on a necessary universal hardware platform, and definitely may also be accomplished by hardware as a less preferred manner. Therefore, the technical solution of the present invention or the part that makes contributions to the prior art may be substantially embodied in the form of a software product. The computer software product may be stored in a computer readable storage medium, for example, a floppy disk, a hard disk, or an optical disk, and contain several instructions to instruct a computer equipment (for example, a personal computer, a server, or a network equipment) to perform the method as described in the embodiments of the present invention.

The above descriptions are merely preferred embodiments of the present invention, but not intended to limit the present invention. Any modification, equivalent replacement, and improvement made without departing from the spirit and principle of the present invention shall fall within the protection scope of the present invention.

What is claimed is:

1. A method of informing a call connection failure in an IP multimedia subsystem (IMS), comprising:
 receiving, by an entrance network element (NE) of a called network, a session request carrying called user identification (ID) information from a calling network;
 determining, by the entrance NE of the called network, whether the called user ID information is complete; and
 if it is determined that the called user ID information is incomplete, sending by the entrance NE of the called network, a response message indicating that the called user ID information is incomplete to the calling network to inform the calling network of a call connection failure;
wherein the session request carries a called user ID information requirement indication which is used to determine whether to return required information for the called user ID information; if it is determined to return the required information according to the called user ID information requirement indication, carrying in the response message the required information from the called network, wherein the response message is sent by the entrance NE of the called network, to the calling network.

2. The method according to claim 1, further comprising:
querying, by the entrance NE of the called network, a user subscription database, so as to determine whether the called user ID information is complete.

3. The method according to claim 1, wherein
determining, by the user subscription database, whether to return the required information for the called user ID information according to the called ID information requirement indication.

4. The method according to claim 1, wherein the required information for the called user ID information comprises at least one of the following information:
a required minimum digit length;
a required maximum digit length;
a required address type; and
a required address format.

5. A call connection method in an IP multimedia subsystem (IMS), comprising:
sending, by a calling network, a session request carrying called user identification (ID) information to an entrance network element (NE) of a called network;
receiving, by the calling network, a response message indicating that the called user ID information is incomplete from the entrance NE of the called network, when it is determined by the entrance NE of the called network that the called user ID information is incomplete;
updating, by the calling network, the called user ID information according to the response message, and sending newly added information of the updated called user ID information to the entrance NE of the called network;
wherein the session request carries a called user ID information requirement indication which is used to determine whether to return required information for the called user ID information; if it is determined to return required information according to the called user ID information requirement indication, carrying in the response message the required information from the called network, wherein the response message is sent by the entrance NE of the called network to the calling network.

6. The method according to claim 5, wherein the updating, by the calling network, the called user ID information comprises:
waiting, by the calling network, for a user to dial digits and collecting the digits; or
converting, by the calling network, the called user ID information according to the required information from the called network for the called user ID information.

7. The method according to claim 5, wherein the sending the newly added information of the updated called user ID information to the entrance NE of the called network comprises:
initiating, by the calling network, a new request in a current session, and carrying the newly added information of the updated called user ID information in the new request; or
releasing, by the calling network, a current session, initiating a new session request to the entrance NE of the called network, and carrying the newly added information of the updated called user ID information in the new session request.

8. An entrance network element (NE) in an IP multimedia subsystem (IMS), comprising a session request receiving unit and a called user identification (ID) information determining unit, wherein
the session request receiving unit is configured to receive a session request carrying called user ID information and a called user ID requirement indication from a calling network; and
the called user ID information determining unit is configured to determine whether the called user ID information is complete and send a response message indicating that the called user ID information is incomplete to the calling network, when determining that the called user ID information is incomplete;
the entrance NE further comprises a called user ID information processing unit; and
the called user ID information processing unit is configured to:
initiate a query request carrying a called user ID information requirement indication to a routing information database; and
carry the required information for the called user ID information returned by a user subscription database according to the called ID information requirement indication in the response message.

9. The entrance NE according to claim 8, wherein
the called user ID information determining unit is further configured to carry the required information for the called user ID information in the response message.

10. A called network system in an IP multimedia subsystem (IMS), comprising an entrance network element (NE) and a routing information database, wherein the entrance NE is configured to receive a session request carrying called user identification (ID) information from a calling network, query the routing information database to determine whether the called user ID information is complete, and send a response message indicating that the called user ID information is incomplete to the calling network when determining that the called user ID information is incomplete; and
the routing information database is configured to save called user address information;
wherein, the entrance NE is further configured to:
send a query message carrying a called user ID information requirement indication to the routing information database, wherein the called user ID information requirement indication is used to determine whether to return required information for the called user ID information;
if it is determined to return required information according to the called user ID information requirement indication, carry the required information from the called network for the called user ID information in the response message.

11. The system according to claim 10, wherein the routing information database is further configured to carry the required information for the called user ID information in the response message.

12. The system according to claim 11, wherein the routing information database is further configured to receive the query message, query called user address information according to the called user ID information, and return the required information for the called user ID information to the entrance NE according to the called ID information requirement indication.

* * * * *